US010032283B2

(12) United States Patent
Baltsen et al.

(10) Patent No.: US 10,032,283 B2
(45) Date of Patent: Jul. 24, 2018

(54) MODIFICATION OF AT LEAST ONE PARAMETER USED BY A VIDEO PROCESSING ALGORITHM FOR MONITORING OF A SCENE

(71) Applicant: Axis AB, Lund (SE)

(72) Inventors: Joakim Baltsen, Malmo (SE); Mats Bylander, Sodra Sandby (SE)

(73) Assignee: Axis AB, Lund (SE)

( * ) Notice: Subject to any disclaimer, the term of this patent is extended or adjusted under 35 U.S.C. 154(b) by 69 days.

(21) Appl. No.: 14/880,416

(22) Filed: Oct. 12, 2015

(65) Prior Publication Data

US 2016/0117837 A1     Apr. 28, 2016

(30) Foreign Application Priority Data

Oct. 23, 2014  (EP) ..................................... 14189977

(51) Int. Cl.
*G06K 9/00*     (2006.01)
*G06T 7/20*     (2017.01)
(Continued)

(52) U.S. Cl.
CPC ............ *G06T 7/20* (2013.01); *G06K 9/00771* (2013.01); *G06K 9/00805* (2013.01);
(Continued)

(58) Field of Classification Search
None
See application file for complete search history.

(56) References Cited

U.S. PATENT DOCUMENTS 3,730,985 A * 5/1973 Whitney .................. H04N 5/33
250/333
7,567,702 B2 * 7/2009 Woodfill .................. G06K 9/32
348/47
(Continued)

FOREIGN PATENT DOCUMENTS

EP     2 271 073 A2     1/2011
JP     2003-6642         1/2003
(Continued)

OTHER PUBLICATIONS

European Search Report dated May 4, 2015 in European Application 14189977, filed on Oct. 23, 2014 ( with Written Opinion).
(Continued)

*Primary Examiner* — Nancy Bitar
(74) *Attorney, Agent, or Firm* — Oblon, McClelland, Maier & Neustadt, L.L.P.

(57) ABSTRACT

There is provided a method, a device and a system for modifying at least one parameter used by a video processing algorithm, such as a motion detection algorithm, an object detection algorithm, or an object tracking algorithm, for monitoring of a scene (102). The method comprises: receiving a first (105*a*) and a second (105*b*) video sequence of the scene (102), wherein the first video sequence (105*a*) is captured using a thermal camera (104*a*) such that the first video sequence (105*a*) comprises thermal information being indicative of temperatures in the scene (102), and applying the video processing algorithm to the second video sequence (105*b*), wherein at least one parameter used by the video processing algorithm is modified based on the thermal information comprised in the first video sequence (105*a*).

13 Claims, 4 Drawing Sheets

(51) Int. Cl.
*G06K 9/20* (2006.01)
*G06T 5/00* (2006.01)
*G06T 5/20* (2006.01)
*H04N 5/33* (2006.01)

(52) U.S. Cl.
CPC ......... *G06K 9/2018* (2013.01); *G06K 9/2054* (2013.01); *G06T 5/002* (2013.01); *G06T 5/20* (2013.01); *H04N 5/33* (2013.01); *G06K 2009/00644* (2013.01); *G06T 2207/10016* (2013.01); *G06T 2207/10048* (2013.01); *G06T 2207/20004* (2013.01); *G06T 2207/20036* (2013.01); *G06T 2207/30232* (2013.01)

(56) References Cited

U.S. PATENT DOCUMENTS

| | | | |
|---|---|---|---|
| 9,531,964 B2 * | 12/2016 | Southerland | G01J 5/025 |
| 2006/0110008 A1 * | 5/2006 | Vertegaal | G06K 9/00604 |
| | | | 382/103 |
| 2010/0182433 A1 | 7/2010 | Shimbo et al. | |
| 2011/0122315 A1 * | 5/2011 | Schweiger | H04N 21/2365 |
| | | | 348/500 |
| 2012/0320086 A1 * | 12/2012 | Kasama | H04N 5/2258 |
| | | | 345/629 |
| 2013/0135468 A1 | 5/2013 | Kim et al. | |
| 2013/0202273 A1 * | 8/2013 | Ouedraogo | H04N 9/79 |
| | | | 386/280 |
| 2013/0286236 A1 * | 10/2013 | Mankowski | H04N 5/23222 |
| | | | 348/222.1 |

FOREIGN PATENT DOCUMENTS

| | | |
|---|---|---|
| JP | 2004-165932 A | 6/2004 |
| JP | 2004-219277 | 8/2004 |
| JP | 2004-295781 A | 10/2004 |
| TW | 476221 B | 2/2002 |
| TW | I284863 B | 8/2007 |
| TW | M462421 U1 | 9/2013 |

OTHER PUBLICATIONS

James W. Davis et al. "Background-subtraction using contour-based fusion of thermal and visible imagery", Computer Vision and Image Understanding, 106, 2007, 21 pages.

I. Ulusoy et al. New method for the fusion of complementary information from infrared and visual images for object detection, IET Image Processing, vol. 5, No. 1, 2011, 13 pages.

Grzegorz Cielniak et al. "People Recognition by Mobile Robots", XP055183546, ftp://www.aass.oru.se/pub/tdt/NIROS/niros1_appendixD.pdf, 2004, 12 pages.

Yuan Been Chen, "A robust fully automatic scheme for general image segmentation", Digital Signal Processing, vol. 21, XP27514448A, 2011, pp. 87-99.

"Thresholds for a thermal image", Math Works, MATLAB Answers, http://nl.mathworks.com/matlabcentral/answers/33059-thresholds-for-a-thermal-image, XP55262037A, 2012, pp. 1-5.

Combined Office Action and Search Report dated Oct. 31, 2017 in Taiwanese Patent Application No. 104134100 (With English translation of categories of cited documents).

Cielniak et al., "People Recognition by Mobile Robots," Center for Applied Autonomous Sensor Systems, Department of Technology, Örebro University, Sweden, 2004, 13 pages.

Notice of Allowance issued in corresponding Korean Application No. 10-2015-0145379 dated May 24, 2018, citing references AO and AP.

\* cited by examiner

MODIFICATION OF AT LEAST ONE PARAMETER USED BY A VIDEO PROCESSING ALGORITHM FOR MONITORING OF A SCENE

TECHNICAL FIELD

The present invention relates to the field of video surveillance. In particular, it relates to a method, a device, and a system for modifying at least one parameter used by a video processing algorithm for monitoring of a scene.

BACKGROUND

In many camera surveillance situations it is important to detect activity, such as presence of objects or motion, at large distances. For natural reasons, objects which are located far away from the camera will be small in images captured by the camera. For instance, they may only cover a few pixels in the images. In order to detect activity at large distances, it is thus necessary to, e.g., be able to detect objects which appear as small in the captured images.

However, detecting small objects usually comes at the cost that false detections increase. This has to do with the fact that there is noise in the images captured by the camera. The noise may easily be mistaken for being a small object and vice versa, thereby leading to false detections. In order to reduce the false detections, video processing algorithms for object detection, motion detection, and/or object tracking, include parameters for such things as intensity change thresholds and noise filtering, including morphological filters to remove small detections. The parameters are typically set so that false detections caused by noise are removed while there is still enough sensitivity to detect actual activity. In other words, there is a trade-off between detection range and avoiding false detections.

The problem of detecting and identifying objects at a large distance has been recognized. In order to solve the problem, it has been suggested to use a thermal camera to identify a position coordinate of a person. The position coordinate is then input to a control method for controlling a second camera, and in particular the direction and zoom thereof, to capture an enlarged image of the person.

Such a method of has the drawback that the second camera is controlled to change its direction and zoom level to follow a specific target object. Accordingly, such method is only suitable for detecting one object at a time.

There is thus room for improvements. In particular, there is a need for alternative methods which allow detection at large ranges at the same time as false detections are reduced.

SUMMARY OF THE INVENTION

In view of the above, it is thus an object of the present invention to provide methods and devices which allow for detection of objects and/or activity at large ranges at the same time as false detections are reduced.

According to a first aspect of the invention, the above object is achieved by a method for modifying at least one parameter used by a video processing algorithm, such as a motion detection algorithm, an object detection algorithm, or an object tracking algorithm, for monitoring of a scene, comprising:

receiving a first and a second video sequence of the scene, wherein the first video sequence is captured using a thermal camera such that the first video sequence comprises thermal information being indicative of temperatures in the scene, and applying the video processing algorithm to the second video sequence, wherein at least one parameter used by the video processing algorithm is modified based on the thermal information comprised in the first video sequence, such that said at least one parameter of the video processing algorithm is made temperature dependent.

With the above method, thermal information in a first video sequence captured by a thermal camera is used to modify, i.e. change, at least one parameter of a video processing algorithm applied to a second video sequence. In this way, the at least one parameter is made dependent on the temperature in the scene. For example, the modification of the at least one parameter may be adapted such that the video processing algorithm is more sensitive to small detections in selective areas with interesting temperatures, such as the temperature of humans, and less sensitive in other areas. As a result, longer detection ranges are possible in areas corresponding to interesting temperatures, while false detections are kept down in areas corresponding to other temperature ranges.

The video processing algorithm, which is an image processing algorithm applied to a sequence of images, may be an algorithm for detection of activity in the scene. This includes algorithms for object detection, motion detection, and object tracking. It should be noted that the video processing algorithm is not an algorithm controlling the functioning of the camera itself.

By modifying the at least one parameter is generally meant that the value of the parameter is modified, i.e. changed. For example, a value of the parameter may be increased or decreased.

Generally, the at least one parameter may be modified with respect to an entire image of the second video sequence. For example, if the thermal information in the first video sequence indicates that there is an object in the scene having a temperature in a temperature of interest, the at least one parameter may be changed such that the video processing algorithm is made more sensitive to small detections across the entire image plane of images of the second video sequence.

The at least one parameter could also be modified over the entire image, but as a function of the temperature, i.e. nothing happens to the numeral value of the parameter in non-interesting temperature regions, and it gets a new value in interesting temperature regions.

In particular, the at least one parameter used by the video processing algorithm may be modified with respect to regions in images of the second video sequence based on thermal information of corresponding regions in images of the first video sequence. In that way, the video processing algorithm may be made more sensitive to small detections in some regions, which may have an interesting thermal content, and less sensitive to small detections (and thereby less sensitive to noise) in other regions.

By thermal information is generally meant any information which is indicative of temperatures in the scene. For example, the thermal information may comprise intensity values of images in the first video sequence, the intensity values being indicative of temperatures in the scene. The at least one parameter used by the video processing algorithm may thus be modified based on the intensity values of images in the first video sequence.

The video processing algorithm may have the purpose of detecting different types of activities in the scene, such as the presence of or motion of a particular or several different types of objects. Different types of objects may be associated with different temperature ranges, and may hence be distinguished based on the thermal information in the first video sequence. For example, human objects may be associated with one temperature range, while the running motor of a car may be associated with another temperature range. Depending on the particular purpose of the video processing algorithm, there may thus be one or more predefined temperature ranges of interest which may be used to distinguish different regions in images of the first video sequence. The one or more predetermined temperature ranges of interest may comprise a temperature range corresponding to the body temperature of a human. Such predefined temperature ranges may for instance be specified by a user.

The method may comprise:

in images of the first video sequence captured by the thermal camera, identifying pixels having an intensity value indicating a temperature in one or more predetermined temperature ranges of interest, wherein the at least one parameter used by the video processing algorithm is modified with respect to regions of the images of the second video sequence that correspond to the pixels that were identified in the images of the first video sequence.

In other words, pixel regions having an interesting thermal content are identified in the first video sequence, and the at least one parameter is modified with respect to corresponding regions in the second video sequence. Accordingly, the at least one parameter may be modified in regions having a particularly interesting temperature content, such as in regions where a human is present, in order to make the video processing algorithm more sensitive to detections of activity in such regions.

As is to be understood, the first and the second video sequence may have different resolutions and may be captured from somewhat different viewing angles of the scene. However, there is still a correspondence between the first and the second video sequence. More specifically, a pixel or a region in an image of the first video sequence corresponds to a pixel or a region in an image of the second video sequence if they represent the same point in the scene.

In accordance with the above, the at least one parameter may be modified with respect to different regions in images of the second video sequence, where the regions are identified on basis of the thermal information in the first video sequence. The at least one parameter is thus allowed to vary across images of the second video sequence, wherein the variation is defined by the thermal information in the first video sequence. In particular, the at least one parameter used by the video processing algorithm may be modified based on the intensity values of the images of the first video sequence such that the at least one parameter varies across images of the second video sequence as a function of the intensity values of the images of the first video sequence. The variation may, e.g., be continuous or step-wise. This is advantageous in that the at least one parameter may be tailored depending on the temperatures in the first video sequence It is to be noted that, the thermal information in the first video sequence may not only be used to decide where, i.e. in what regions, to modify the at least one parameter, but also to decide how or how much to modify the at least one parameter. By letting the at least one parameter vary across images of the second video sequence as a function of the intensity values of the images of the first video sequence, also the size of the modification is a function of the intensity values of the images of the first video sequence. For example, the amount of increase or decrease of a parameter may be a function of the intensity values of the images of the first video sequence.

The at least one parameter may be a parameter related to detection of activity in the scene. This includes parameters for object detection, motion detection, and object tracking.

For example, the at least one parameter may comprise a threshold for detection of activity, such as there being motion or an object present. In particular, the video processing algorithm may comprise comparing differences in intensity values between subsequent images in the second video sequence to a threshold, wherein the threshold is modified based on the thermal information in the first video sequence. For instance, the threshold may be increased in regions corresponding to interesting thermal contents. In this way, the video processing algorithm may be made more sensitive to detection of activity (and also more sensitive to noise) in areas of interest, and less sensitive in other areas.

The at least one parameter may comprise a parameter used in a filter for removal of small detections (suspected to be noise), such as removal of small contiguous or connected groups of pixels, also referred to as clusters of pixels. For instance, the at least one parameter may comprise a threshold for the size of the contiguous group of pixels, such that contiguous groups of pixels having a size below the threshold are removed. In this way, the video processing algorithm may be made more sensitive to detection of activity (and also more sensitive to noise) in areas of interest, and less sensitive in other areas.

According to examples, the video processing algorithm comprises smoothing filtering, wherein at least one parameter of said smoothing filtering is modified based on the thermal information in the first video sequence. By smoothing filtering is meant applying a smoothing filter. The smoothing filtering may be applied to the images of the second video sequence. The smoothing filter may either be a temporal filter (which has a smoothing effect in the temporal direction) and/or a spatial filter (which has a smoothing effect in space). Examples of spatial smoothing filters are morphological filters and median filters.

Thus, the smoothing filtering may comprise morphological filtering for removal of small detections (suspected to be noise). In particular, the smoothing filtering may comprise morphologic filtering of images of the second video sequence using a structuring element, wherein the structuring element is modified based on the thermal information in the first video sequence. The modification may include modifying at least one of a size and a shape of the structuring element. In this way, the video processing algorithm may be made more sensitive to detection of activity (and also more sensitive to noise) in areas of interest, and less sensitive in other areas.

The thermal camera may comprise a long wave infrared, LWIR, sensor. LWIR sensors are advantageous in that they complement visible light sensors in a way other infrared sensors may not do.

The second video sequence may be captured by a visual light camera. This is advantageous in that visual light cameras typically have a higher resolution than, e.g., thermal cameras, thereby simplifying detection and tracking.

The second video sequence may be captured by the thermal camera. This is advantageous, for instance, in that thermal cameras do not need external light for capturing useful images at night and in other low light situations. Another advantage is that only one camera needs to be provided.

According to a second aspect of the invention, the above object is achieved by a computer program product comprising a computer-readable storage medium with instructions adapted to carry out the method of the first aspect when executed by a processor.

According to a third aspect of the invention, the above object is achieved by a processing device for modifying at least one parameter used by a video processing algorithm, such as a motion detection algorithm, an object detection algorithm, or an object tracking algorithm, for monitoring of a scene, comprising:

a receiver configured to receive a first and a second video sequence of the scene, wherein the first video sequence is captured using a thermal camera such that the first video sequence comprises thermal information being indicative of temperatures in the scene, a video processing component configured to apply the video processing algorithm to the second video sequence in order to monitor the scene, wherein the video processing component is configured to modify at least one parameter used by the video processing algorithm based on the thermal information comprised in the first video sequence, such that the at least one parameter of the video processing algorithm is made temperature dependent.

According to a fourth aspect of the invention, the above object is achieved by a system for modifying at least one parameter used by a video processing algorithm, such as a motion detection algorithm, an object detection algorithm, or an object tracking algorithm, for monitoring of a scene, comprising:

one or more cameras configured to capture a first and a second video sequence of the scene, wherein the one or more cameras comprise a thermal camera adapted to capture the first video sequence such that the first video sequence comprises thermal information being indicative of temperatures in the scene, a processing device according to the third aspect configured to receive and process the first and the second video sequence in order to modify parameters used by a video processing algorithm.

The second, third and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
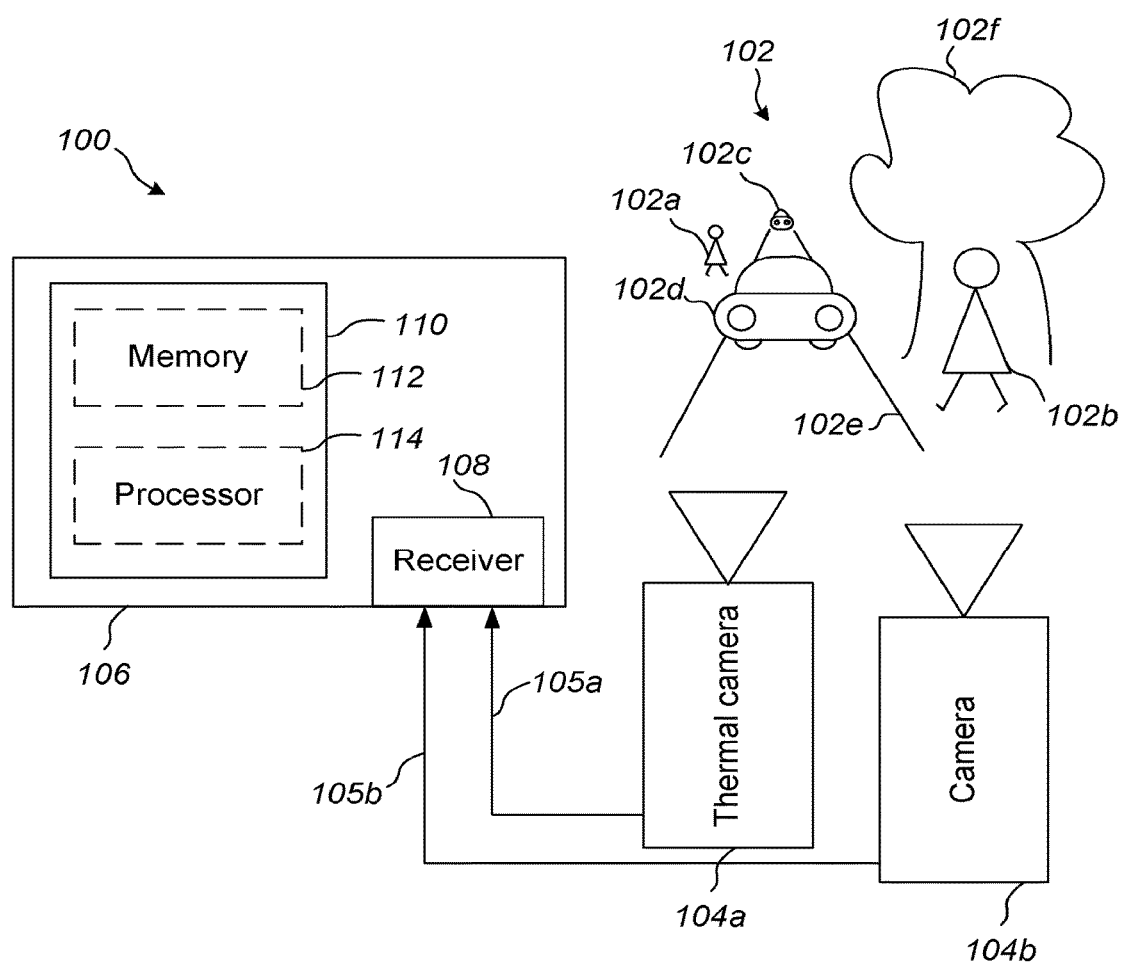
FIG. 1 illustrates a system for modifying at least one parameter used by a video processing algorithm for monitoring of a scene according to embodiments.

FIG. 1 illustrates a system 100 for monitoring of a scene 102. The system 100 comprises one or more cameras 104a and 104b, here illustrated by two cameras, and a processing device 106.

The scene 102 may include a number of objects 102a-f, in this case illustrated by persons 102a and 102b, cars 102c and 102d, a road 102e, and a tree 102f. Some of the objects, such as the persons 102a and 102b and the cars 102c and 102d, may be moving and other objects, such as the road 102e and the tree 102f (at least if it is not windy), may be stationary. The objects 102a-f may also be of different sizes and may be located at different distances from the cameras 104a-b. For example, objects 102a and 102c are located far away from the cameras 104a-b in comparison to objects 102b, 102d, 102f. Objects which are small and/or located far away from the cameras 104a-b, may be difficult to distinguish in images captured by at least some of the cameras 104a-b. The objects 102a-f may also be associated with different temperatures or temperature ranges. For example, the persons 102a-b may be associated with a temperature range corresponding to the body temperature of a human, and the cars 102c-d may be associated with a temperature range corresponding to the temperature of a running motor. Other objects, such as the tree 102f, do not generate heat by their own and are therefore typically associated with a temperature range corresponding to the ambient temperature.

One of the one or more cameras 104a-b, here camera 104a, is a thermal camera. Preferably, camera 104a comprises a long wave infrared, LWIR, sensor. LWIR sensors are advantageous in that they complement visible light cameras in another way than other infrared sensors. Another camera of the one or more cameras 104a-b, such as camera 104b, may be a visible light camera. According to other examples, also the second camera 104b may be a thermal camera. The cameras 104a-b are, mainly for reasons of illustration, shown as separate cameras. However, it is to be understood that the one or more cameras 104a-b may be combined into a single unit, such as a combined thermal and visible light camera.

The one or more cameras 104a-b are arranged to view the scene 102 and to capture video sequences of the scene 102 for monitoring purposes. In more detail, the one or more cameras 104a-b are arranged to capture a first video sequence 105a and a second video sequence 105b of the scene 102. In case the system 100 only comprises one camera 104a (which then is a thermal camera), the first 105a and the second video sequence 105b may be captured by the same camera. The first 105a and the second 105b video sequence may even be the same video sequence. In the illustrated example, however, the first video sequence 105a is captured by the first, thermal, camera 104a and the second video sequence 105b is captured by the second camera 104b.

The processing device 106 comprises a receiver 108 and a video processing component 110 which communicates with the receiver 108. The processing device 106 may be provided separately from the one or more cameras 104a-b or may be included in one of the cameras 104a-b. In any case, the processing device 106 is operatively connected, via a wired or wireless connection, to the one or more cameras 104a-b such that it via receiver 108 may receive the first 105a and the second 105b video sequence from the one or more cameras 104a-b.

The video processing component 110 is configured to apply a video processing algorithm to the second video sequence 105b for the purpose of monitoring the scene 102. For instance, the video processing component 110 may be configured to detect activity, such as the presence of objects and/or motion, as well as performing object tracking, in the scene 102. The video processing algorithm applied for that purpose may for instance be any known algorithm for motion detection, object detection, and/or object tracking.

Video processing algorithms of the type mentioned above are typically associated with at least one parameter including parameters related to detection of activity, such as thresholds and parameters related to different filters. The video processing component 110 is configured to modify the at least one parameter prior to application of the video processing algorithm. Such modification of the at least one parameter is based on information in the first video sequence 105a as will be described in more detail below.

The video processing component 110 may be implemented in hardware, software or a combination thereof. In particular, the video processing component 110 may comprise a memory 112, and a processor 114, such as a central processing unit. The memory 112 may act as a (non-transitory) computer-readable medium or storage device, and may store computer-code instructions related to any method described herein. In particular, when executed by the processor 114, the computer-code instructions are adapted to carry out any method described herein.

Figure 2:
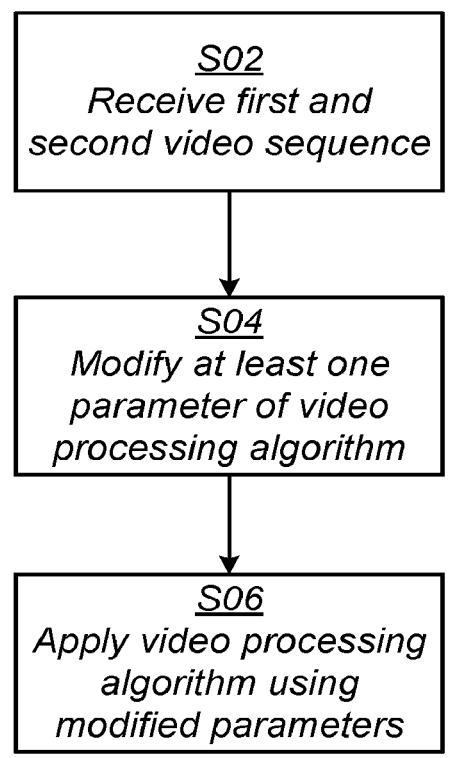
FIG. 2 is a flow chart of a method for modifying at least one parameter used by a video processing algorithm for monitoring of a scene according to embodiments.
Figure 3:
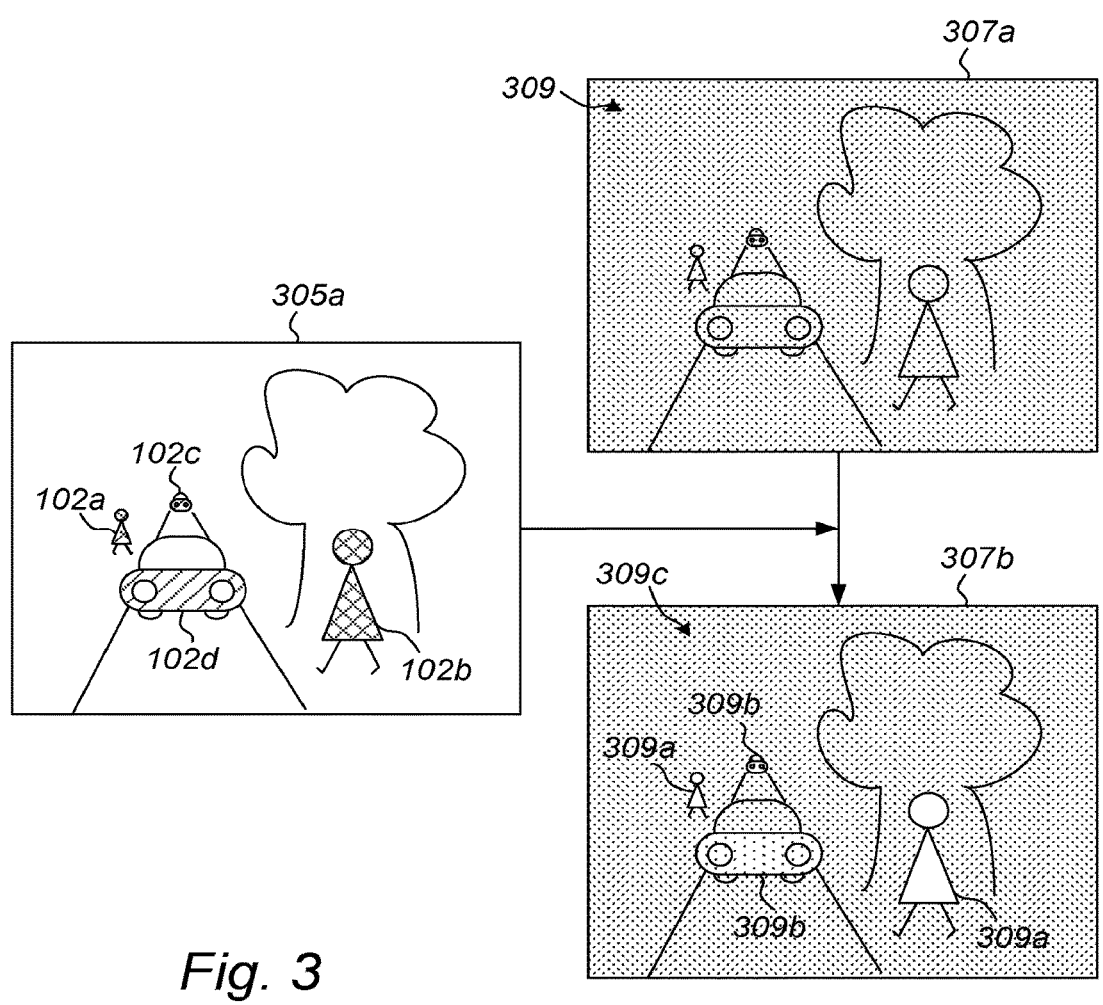
FIG. 3 illustrates modification of a parameter to be used by a video processing algorithm based on thermal information according to embodiments.

The operation of the system 100 and, in particular, the operation of the processing device 106 will now be described with reference to FIG. 1, FIG. 3, and the flow chart of FIG. 2.

In step S02, the processing device 106, via receiver 108, receives the first 105a and the second 105b video sequence from the one or more cameras 104a-b. In the following examples it is assumed that the first video sequence 105a comes from the thermal camera 104a, and that the second video sequence 105b comes from a visual light camera 104b.

The first video sequence 105a, and in particular the images in the first video sequence 105a, captured by the thermal camera 104a comprises thermal information which is indicative of temperatures in the scene 102. The thermal information may for example comprise intensity values of the images in the first video sequence 105a, where the intensity values are indicative of temperatures in the scene 102. The temperatures could be absolute temperatures, or they could just represent certain temperature deviations from the rest of the scene FIG. 3 schematically illustrates an image 305a of the scene 102 in the first video sequence 105a. In image 305a, the persons 102a-b are imaged with an intensity corresponding to a first temperature range which is a temperature range corresponding to the body temperature of a human. In the image 305a this is illustrated by the persons having a first pattern. Similarly, the cars 102c, 102d are imaged with an intensity corresponding to a second temperature range which e.g. is a temperature range corresponding to the temperature of a running motor. In the image 305b this is illustrated by the cars having a second pattern.

In step S04, the video processing component 110 of the processing device 108 proceeds to modify at least one parameter of a video processing algorithm to be applied to the second video sequence 105b.

By default (and as known in the prior art), the video processing algorithm will apply the same value of the at least one parameter across the whole image plane of images in the second video sequence 105b. This is further illustrated in FIG. 3 which shows an image 307a from the second video sequence 105b. In the image 307a, the value of a parameter 309 of the video processing algorithm is overlaid as illustrated by the dotted pattern. The value of the parameter is the same across the whole image plane of image 307a.

The video processing component 110 modifies the at least one parameter 309 in order to make the parameter 309 dependent on the temperature in the scene 102. For this purpose, the video processing unit 110 modifies the parameter 309 based on thermal information comprised in the first video sequence 105a, e.g. as illustrated by image 305a. For example, the video processing unit 110 may modify the parameter 309 such that it takes an updated value across the entire image plane of the images of the second video sequence 105b.

More preferably, the parameter 309 may be modified such that it takes different values in different parts or regions of the image 307a of the second video sequence 105b. For example, as illustrated in image 307b of FIG. 3, the parameter 309 may take a first value 309a in a first region, a second value 309b in a second region, and a third value 309c in a third region.

The regions may be found by considering the thermal information in the first video sequence, such as in image 305a. In more detail, the regions in the image 307b in the second video sequence 105b may correspond to some regions in the image 305a of the first video sequence 105a. Here the images 305a and 307b are assumed to be temporally aligned. The regions in the image 305a may be identified on basis of the thermal information. For example, a region may be identified in the image 305a as those pixels that have an intensity value (i.e. a temperature value) corresponding to a predetermined temperature range of interest, such as the temperature range corresponding to the body temperature of a human, or the temperature range corresponding to the temperature of a running motor. By identifying regions in that way, a first region may be identified as the pixels corresponding to the persons 102a, 102b, and a second region may be identified as the pixels corresponding to the cars, 102c, 102d. Accordingly, the video processing component 110 may modify the parameter 309 to take different values in the different regions. In the illustrated example, the parameter would thus be modified to take a first value 309a in regions where one may expect to find a human, and a second value 309b in regions where one may expect to find a car having a running motor.

The thermal information in first video sequence 105a may not only be used to decide where in the image plane to modify the parameter 309. It may also be used to determine the size of the modification, i.e. how much the parameter 309 should be modified or adjusted. Generally, the size of the modification may be set as a function of the thermal information in the first video sequence 105a. In more detail, the intensity values in the images, such as image 305a, of the first video sequence 105a are indicative of temperature. Thus, the size of the modification of the parameter may be set as a function of the intensity of the images 305a of the first video sequence 105a. In the illustrated example, the first value 309a may thus be set according to the intensity values in pixels corresponding to the persons 102a, 102b in image 305a, the second value 309b may be set according to the intensity values in pixels corresponding to the cars 102c, 102d in image 305a.

In the above examples, it was described that the parameter 309 may take different values in different parts or regions of the image plane. This does not necessarily imply that the parts or regions of the image plane have strict borders. More generally, the parameter 309 may be modified to vary across the image 307b as a function of the intensity values of corresponding pixels in the image 305a. In that way, the value of the parameter 309 will vary spatially in the image plane of image 307b since the intensity values (the temperature) in the image 305a vary spatially in the image plane of image 305a.

The at least one parameter 309 may be a threshold which for instance is used to detect motion, detect objects, and/or track objects. In more detail, there may be a threshold for detecting a change in intensity values between consecutive images in the second video sequence 105b. For example, the video processing algorithm may compare differences in intensity values between subsequent images in the second video sequence 105b to a threshold in order to detect activity, such as motion, in the scene 102. The intensity change threshold may have been modified in step S04, by the video processing component 110 prior to the application of the video processing algorithm. For example, the intensity change threshold may have been lowered in parts or regions 309a and/or 309b of the image 307b where the temperature, as given by the image 305a of the thermal camera 104a, was found to be within a temperature range of interest. In this way, the video processing algorithm will be made more sensitive to changes in intensity in those parts or regions of the image 307b of the second video sequence 105b. In other regions, the intensity change threshold may for instance be raised or left unmodified. In this way, the false detections caused by activity in other temperature ranges may be kept down. As further mentioned above, the video processing component 110 may also modify, i.e. raise or lower, the intensity change threshold as a function of the intensity in the image 305a of the first video sequence 105a.

The one or more parameters may also be related to noise filtering and filters for removal of small detections (which presumably are caused by noise). By way of example, there may be a parameter which sets a threshold for the size of a contiguous group of pixels. If the video processing component 110, in an image or in a difference between images of the second video sequence, detects a contiguous group of pixels which is larger than the threshold, it may be decided that an object or motion is present. If the size is lower than the threshold, it may be decided that the contiguous group of pixels is too small and is therefore removed to avoid a false detection.

The video processing component 110, may also remove detection of small objects and/or motion by application of morphological filters, such as filters for erosion, to images or differences between images of the second video sequence 105b. In particular, the video processing component 110 may morphologically filter images or differences between images of the second video sequence 105b by using a structuring element. The video processing component 110 may modify the structuring element in step S04 prior to the application of the video processing algorithm. For example, the video processing component 110 may modify the size and/or the shape of the structuring element. For example, the video processing component 110 may decrease the size of the structuring element used for, e.g., erosion in parts or regions of images 307b of the second video sequence 105b corresponding to a temperature range of interest, and otherwise increase or leave the size of the structuring element unmodified. In this way, the morphological filtering operation may leave more (and smaller) detections in regions corresponding to a temperature range of interest in comparison to other regions, thereby making the video processing algorithm more sensitive to detections in regions corresponding to a temperature range of interest.

The video processing algorithm may be a motion detection algorithm. Various motion detection algorithms are known, ranging from simple comparisons of two successive images and counting the number of pixels that have changed intensity values between the two images, to more complex algorithms, e.g., employing a spatio-temporal slicing. In simple pixel difference algorithms, thresholds for the differences in intensity values may be used for reducing false detections, such that the difference in intensity value has to be above the threshold to be considered a change. The thermal information may be used for modifying such a threshold. Further, the number of changed pixels may be compared to a predetermined reference number, such that a number of changed pixels below the reference number will not be considered motion, but if more pixels than the reference number have changed, this will be considered motion. The thermal information may be used for modifying such a reference number.

More refined motion detection algorithms may involve comparing not one image to another, but forming a background model of several previous images, and comparing a new image to the background model. The background model may be formed by infinite impulse response filtering. In this way, a temporal filtering may be achieved, reducing false detections caused by noise. In addition to the parameters already discussed for the simple motion detection algorithms, the thermal information may in such a temporally filtered method be used, e.g., for modifying the impact of each new image, i.e. modifying the factor with which a new image is weighted into the background model.

In U.S. Pat. No. 8,121,424 a motion detection algorithm using spatio-temporal slice processing is disclosed. Here, images of a video sequence are combined into an image volume having vertices X, Y, and t, where X and Y are spatial coordinates, and t signifies time. The image volume is sliced in either the (X, t) or (Y, t) planes. A search is performed along search lines in the video sequence to locate motion. Motion may be detected by identifying lines that are not parallel to any of the vertices. Stationary objects and changes in lighting will instead appear as lines parallel to one of the vertices. Here, the thermal information may be used, e.g., for modifying the period of time t during which images in the image volume are captured, for modifying the spatial size of the image volume and/or for modifying a threshold for a number of adjacent like pixels along a search line required to be detected as motion.

In step S06, the video processing component 110 subjects the second video sequence 105b to the video processing algorithm using the modified at least one parameter 309a, 309b, 309c. The video processing algorithm may generally be any type of video processing algorithm that provides an output which may be used when monitoring or surveilling the scene 102. In particular, the video processing algorithm may be an algorithm for detecting activity at large distances, such as in perimeter surveillance. This may include motion detection algorithms, object detection algorithms, and/or object tracking algorithms.

An example will now be described with reference to FIGS. 4a and 4b in order to illustrate some of the benefits of the disclosed method. In this example it is assumed that the video processing algorithm is an algorithm for object detection, and that the object detection algorithm is associated with a parameter which is a threshold for the size of an object, e.g., in terms of the number of contiguous pixels, used by the video processing component 110 to decide whether an object is present or not.

Figure 4A:
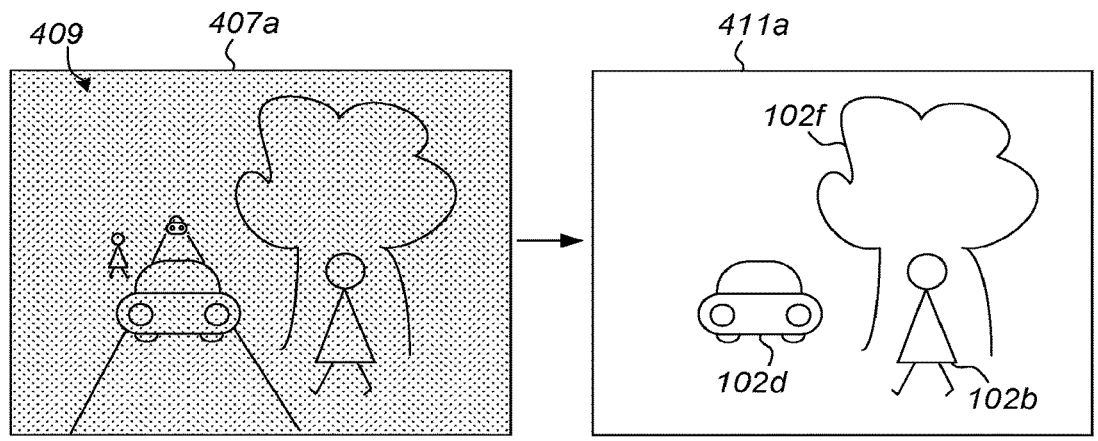
FIG. 4a illustrates an example of object detection in which a parameter is not modified prior to application of an object detection algorithm.
Figure 4B:
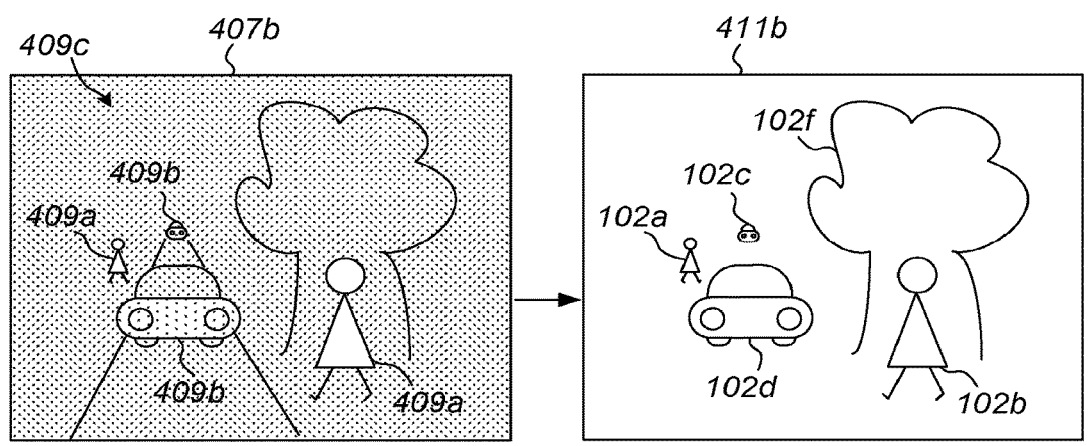
FIG. 4b illustrates an example of object detection in which a parameter is modified according to embodiments prior to application of an object detection algorithm.

FIG. 4a illustrates the case where the parameter is not modified before application of the video processing algorithm to images of the second video sequence 105b, and FIG. 4b illustrates the case where the parameter, in accordance with embodiments, is modified before application of the video processing algorithm to images of the second video sequence 105b.

In FIG. 4a the parameter 409 takes the same value across the entire image plane of images 407a of the second video sequence 105b. The value of the parameter 409 is typically set such that the number of false object detections is reduced, i.e., possible object detections that cover a number of pixels being lower than the parameter 409 are removed as being non-objects. However, this is at the cost of the possibility of detecting small objects, such as objects being located far away from the camera. This is further illustrated in image 411a, showing the objects that were identified in image 407a by the video processing component 110. In this case, the video processing algorithm managed to detect objects 102b, 102d and 102f. However, notably, objects 102a and 102c which were located far away from the camera 104b in the scene 102 were not detected, since their size fell below the threshold value of parameter 409

In FIG. 4b, the parameter is modified by the video processing component 110 (see step S04 above) prior to application of the object detection algorithm. As explained with reference to FIG. 3, the parameter is thus modified to take different values 409a, 409, 409c in different regions of images 407b of the second video sequence 105b depending on thermal information in the first video sequence 105a. For example, the parameter may be set to have a lower value 409a, 409b in regions of the image 407b corresponding to temperature ranges of interest in comparison to other regions of the image 407b. In this way, smaller objects are allowed to be detected in those regions corresponding to temperature ranges of interest in comparison to other regions. This is further illustrated in image 411b, showing the objects that are identified in image 407b by the video processing component 110. In this case the video processing algorithm also managed to detect objects 102a and 102c, due to the modified values 409a, 409b of the object detection threshold in these regions.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for modifying at least one parameter used by a video processing algorithm, such as a motion detection algorithm, an object detection algorithm, or an object tracking algorithm, for monitoring of a scene, the method comprising: receiving a first and a second video sequence of the scene, wherein the first video sequence is captured using a thermal camera such that the first video sequence includes thermal information being indicative of temperatures in the scene; and applying, via processing circuitry, the video processing algorithm to the second video sequence, wherein at least one parameter used by the video processing algorithm is modified based on the thermal information included in the first video sequence, such that said at least one parameter of the video processing algorithm is made temperature dependent, wherein the processing circuitry determines in which regions of the second video sequence said at least one parameter is modified and how much the at least one parameter is modified in said regions based on the thermal information; wherein the thermal information comprises intensity values of images in the first video sequence, the intensity values being indicative of temperatures in the scene, and wherein the at least one parameter used by the video processing algorithm is modified based on the intensity values of images in the first video sequence; and identifying, in images of the first video sequence captured by the thermal camera, pixels having an intensity value indicating a temperature in one or more predetermined temperature ranges of interest, wherein the at least one parameter used by the video processing algorithm is modified with respect to regions of the images of the second video sequence that correspond to the pixels that were identified in the images of the first video sequence.

2. The method of claim 1, wherein the at least one parameter used by the video processing algorithm is modified with respect to regions in images of the second video sequence based on thermal information of corresponding regions in images of the first video sequence.

3. The method of claim 1, wherein the one or more predetermined temperature ranges of interest comprise a temperature range corresponding to the body temperature of a human.

4. The method of claim 1, wherein the at least one parameter used by the video processing algorithm is modified based on the intensity values of the images of the first video sequence such that the at least one parameter vary across images of the second video sequence as a function of the intensity values of the images of the first video sequence.

5. The method of claim 1, wherein the video processing algorithm comprises comparing differences in intensity values between subsequent images in the second video sequence to a threshold, wherein the threshold is modified based on the thermal information in the first video sequence.

6. The method of claim 1, wherein the video processing algorithm comprises smoothing filtering, wherein at least one parameter of said smoothing filtering is modified based on the thermal information in the first video sequence.

7. The method according to claim 6, wherein said smoothing filtering comprises morphologic filtering of images of the second video sequence using a structuring element, wherein the structuring element is modified based on the thermal information in the first video sequence.

8. The method of claim 1, wherein the thermal camera comprises a long wave infrared (LWIR) sensor.

9. The method of claim 1, wherein the second video sequence is captured by a visual light camera.

10. The method of claim 1, wherein the second video sequence is captured by the thermal camera.

11. A non-transitory computer-readable medium having stored thereon computer-readable instructions which when executed by a computer cause the computer to perform the method of claim 1.

12. A processing device for modifying at least one parameter used by a video processing algorithm, such as a motion detection algorithm, an object detection algorithm, or an object tracking algorithm, for monitoring of a scene, the processing device comprising: a receiver that receives a first and a second video sequence of the scene, wherein the first video sequence is captured using a thermal camera such that the first video sequence includes thermal information being indicative of temperatures in the scene; and processing circuitry that applies the video processing algorithm to the second video sequence in order to monitor the scene, modifies at least one parameter used by the video processing algorithm based on the thermal information included in the first video sequence, such that the at least one parameter of the video processing algorithm is made temperature dependent, and determines in which regions of the second video sequence said at least one parameter is modified and how much the at least one parameter is modified in said regions based on the thermal information; wherein the thermal information comprises intensity values of images in the first video sequence, the intensity values being indicative of temperatures in the scene, and wherein the at least one parameter used by the video processing algorithm is modified based on the intensity values of images in the first video sequence; and identifying, in images of the first video sequence captured by the thermal camera, pixels having an intensity value indicating a temperature in one or more predetermined temperature ranges of interest, wherein the at least one parameter used by the video processing algorithm is modified with respect to regions of the images of the second video sequence that correspond to the pixels that were identified in the images of the first video sequence.

13. A system for modifying at least one parameter used by a video processing algorithm, such as a motion detection algorithm, an object detection algorithm, or an object tracking algorithm, for monitoring of a scene, the system comprising: one or more cameras that capture a first and a second video sequence of the scene, wherein the one or more cameras include a thermal camera adapted to capture the first video sequence such that the first video sequence includes thermal information being indicative of temperatures in the scene; and processing circuitry that applies the video processing algorithm to the second video sequence in order to monitor the scene, modifies at least one parameter used by the video processing algorithm based on the thermal information included in the first video sequence, such that the at least one parameter of the video processing algorithm is made temperature dependent, and determines in which regions of the second video sequence said at least one parameter is modified and how much the at least one parameter is modified in said regions based on the thermal information; wherein the thermal information comprises intensity values of images in the first video sequence, the intensity values being indicative of temperatures in the scene, and wherein the at least one parameter used by the video processing algorithm is modified based on the intensity values of images in the first video sequence; and identifying, in images of the first video sequence captured by the thermal camera, pixels having an intensity value indicating a temperature in one or more predetermined temperature ranges of interest, wherein the at least one parameter used by the video processing algorithm is modified with respect to regions of the images of the second video sequence that correspond to the pixels that were identified in the images of the first video sequence.

* * * * *